US010610967B2

(12) United States Patent
Mottin

(10) Patent No.: US 10,610,967 B2
(45) Date of Patent: Apr. 7, 2020

(54) PROCESS FOR COMPLETE CLADDING OF METAL PARTS OF AIRCRAFT TURBOJETS, AND COMPLETE PROTECTION TOOL FOR IMPLEMENTING THE PROCESS

(71) Applicant: SAFRAN AIRCRAFT ENGINES, Paris (FR)

(72) Inventor: Jean-Baptiste Mottin, Poitiers (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 14/405,945

(22) PCT Filed: May 23, 2013

(86) PCT No.: PCT/FR2013/051118
§ 371 (c)(1),
(2) Date: Dec. 5, 2014

(87) PCT Pub. No.: WO2013/182773
PCT Pub. Date: Dec. 12, 2013

(65) Prior Publication Data
US 2015/0147489 A1 May 28, 2015

(30) Foreign Application Priority Data
Jun. 6, 2012 (FR) ..................... 12 55288

(51) Int. Cl.
B23K 26/34 (2014.01)
F01D 5/00 (2006.01)
(Continued)

(52) U.S. Cl.
CPC ............ B23K 26/34 (2013.01); B23K 26/08 (2013.01); B23K 26/0823 (2013.01);
(Continued)

(58) Field of Classification Search
None
See application file for complete search history.

(56) References Cited

U.S. PATENT DOCUMENTS 6,326,585 B1 12/2001 Aleshin et al.
9,027,244 B2 * 5/2015 Nebesni ............. B23K 26/0823
29/889.1
(Continued)

FOREIGN PATENT DOCUMENTS

DE 10 2008 056 336 A1 5/2010
DE WO 2011157354 A1 * 12/2011 ......... B23K 26/0823
WO 2009/118213 A1 10/2009

OTHER PUBLICATIONS

International Search Report issued in International Patent Application No. PCT/FR2013/051118, dated Sep. 4, 2013.

Primary Examiner — Joel G Horning
(74) Attorney, Agent, or Firm — Pillsbury Winthrop Shaw Pittman LLP

(57) ABSTRACT

A process for cladding a metal part of an aircraft turbojet, including a plurality of metal portions, using a nozzle for emitting a laser beam, the process including positioning the metal part to be cladded on a turntable; positioning a cover on the turntable; positioning the nozzle in an aperture present in the cover; introducing an inert gas under the cover; and cladding a first portion of the metal part by carrying out operations of: spraying metal powders; emitting the laser beam; and moving the nozzle relative to the first metal portion.

15 Claims, 2 Drawing Sheets

(51) Int. Cl.
*B23P 6/00* (2006.01)
*B23K 26/08* (2014.01)
*B23K 26/12* (2014.01)
*B23K 35/02* (2006.01)
*B23K 26/144* (2014.01)
*B23K 26/32* (2014.01)
*B23K 103/14* (2006.01)
*B23K 103/10* (2006.01)
*B23K 103/18* (2006.01)
*B23K 103/00* (2006.01)
*B23K 101/00* (2006.01)

(52) U.S. Cl.
CPC ............ *B23K 26/12* (2013.01); *B23K 26/127* (2013.01); *B23K 26/144* (2015.10); *B23K 26/32* (2013.01); *B23K 35/0244* (2013.01); *B23P 6/007* (2013.01); *F01D 5/005* (2013.01); *B23K 2101/001* (2018.08); *B23K 2103/10* (2018.08); *B23K 2103/14* (2018.08); *B23K 2103/26* (2018.08); *B23K 2103/50* (2018.08); *F05D 2230/234* (2013.01)

(56) References Cited

U.S. PATENT DOCUMENTS

2002/0172570 A1* 11/2002 Tsurumaki ......... B23Q 11/0825
  409/134
2007/0251072 A1* 11/2007 Beeson .................. B23P 6/007
  29/402.01

* cited by examiner

PROCESS FOR COMPLETE CLADDING OF METAL PARTS OF AIRCRAFT TURBOJETS, AND COMPLETE PROTECTION TOOL FOR IMPLEMENTING THE PROCESS

CROSS REFERENCE TO RELATED APPLICATIONS

This application is the U.S. National Stage of PCT/FR2013/051118, filed May 23, 2013, which in turn claims priority to French Patent Application No. 1255288, filed Jun. 6, 2012, the entire contents of all applications are incorporated herein by reference in their entireties.

TECHNICAL FIELD OF THE INVENTION

This invention relates to a global process for cladding metal parts of aircraft turbojets. It also relates to a special tool for complete protection of metal parts to be cladded using the process according to the invention.

Therefore, the technical domain of the invention in general is aircraft engines and more particularly repair using a process for cladding some metal parts of aircraft engines.

Without being limitative, the metal part considered is advantageously for example a blade of a single-piece blisk, or any part with a trailing edge and/or a leading edge, for example low pressure turbine blades. In practice, the invention relates to any metal part of an aircraft turbojet with a portion (and particularly an end) on which a cladding operation is required, in order words a repair by reconstructing an appropriate shape of the part considered using a TIP type repair process. TIP type repair processes use a directed laser projection (or a directed electron beam) process causing selective powder fusion (process known under the terms "laser cladding" and "laser metal deposition") in which the part considered is reconstructed by successive passes of a laser over a powder deposit.

Metal parts that are advantageously concerned by the invention are parts for which there is a risk of oxidation during the cladding operation, this applies to metal parts containing titanium, nickel, aluminium and cobalt. For such parts, it is necessary to prevent any deterioration of the mechanical properties of the part considered, and to prevent any oxidation of said part.

TECHNOLOGICAL BACKGROUND OF THE INVENTION

The state of the art comprises different solutions for performing such laser cladding operations in order to repair some metal parts while preventing an oxidation phenomenon of the part considered. In particular, the solution shown in FIG. 1 has been disclosed. In this figure, a blade 101 is shown in which one end 102 has been damaged and for which cladding by laser fusion is necessary. This is done using a nozzle 103 emitting a laser beam, or more generally an electron beam, to melt a powder so as to clad the end 102.

In this illustrated process, a protection chamber 104 is placed at the end of the nozzle 103. The protection chamber 104 has a lower end with a notch 105 globally in the shape of an inverted U, notch 105 inside which the end 102 to be cladded is inserted. The oxygen inside the volume of the notch 105 is expelled by injecting a neutral gas, for example argon or helium, through pipes 106 connected to the nozzle 103; the end 102 may thus be cladded without any oxidation phenomenon occurring. Therefore in such an example, a gas from the nozzle is used as local protection for the zone to be reconstructed.

However, such a process is not satisfactory for cladding the end 102 over a significant distance of a few centimetres. The end 102 of the blade 101 is curved, and the limited translational displacement of the nozzle 103 prevents the protection chamber from moving over this significant distance. The notch 105 must be limited in size to allow its filling by a neutral gas and so that the protection chamber 104 can be inserted between the blade 101 and adjacent blades (not shown). The consequence of this limitation in size is that the walls of the notch 105 are close to each other and quickly come into contact with the end 102, preventing movement of the end 102 inside the notch 105 and consequently making it impossible to clad the entire end 102 to be cladded. Furthermore, despite efforts made, the oxidation phenomenon cannot be entirely eliminated with this process.

The state of the art also discloses the use of large booths that create a space that can either be filled with neutral gas or inside which a vacuum can be created and into which the part to be cladded and all the equipment required for cladding are inserted; but such a solution is expensive and slow in practice due to the large quantities of inert gases inserted into the booth considered.

GENERAL DESCRIPTION OF THE INVENTION

The purpose of the invention provides a solution to the problems that have just been presented, by disclosing a global process and a protective tool for cladding metal parts that is inexpensive, easy to use, that makes it possible to clad different metal portions of the same metal part quickly without consuming very much neutral gas.

This is achieved particularly by arranging the metal part comprising different metal portions to be cladded on a turntable, the space surrounding the metal part being made leak tight by a lid with an opening inside which the nozzle emitting the laser beam or the electron beam will be inserted. Use of the turntable in this advantageous process makes it possible to quickly position the different portions to be cladded facing the nozzle.

The invention thus essentially relates to a process for cladding a metal part of an aircraft turbojet, said metal part comprising a plurality of metal portions to be cladded, said process using a nozzle emitting a laser beam or an electron beam that will melt a sprayed powder thus cladding said metal parts to be cladded, characterised in that said process comprises the following different steps:

put the metal part comprising the plurality of metal portions to be cladded in position on a turntable;

put a lid in position on the turntable, all of said metal part being positioned under said lid;

insert the nozzle into an opening present in the lid;

inject a neutral gas under the lid;

clad a first portion of the plurality of metal portions of the metal part by performing a metallic powder spray operation, a laser beam emission operation to clad said first metal portion, and a relative displacement operation of the nozzle relative to said first metal part following a predetermined cladding trajectory.

Apart from the main characteristics mentioned in the previous paragraph, the process according to the invention may have one or several additional characteristics among the following taken individually or in any technically possible combination:

the process comprises the additional step consisting of fixing the lid onto the turntable in a sealed manner before the step consisting of adding the inert gas.

the process comprises the additional step consisting of fitting a telescopic tray in which there is an orifice inside which the nozzle is inserted, into the opening present in the lid.

the process comprises the following different additional steps after the cladding step of the first metal portion:

rotate the turntable relative to the opening in the lid until a second metal portion among the plurality of metal portions to be cladded is facing the nozzle;

clad the second metal portion of the metal part.

the process comprises an additional step consisting of performing a feeling operation of the metal portions to be cladded to determine the nozzle cladding trajectories, after the metal part comprising the plurality of metal portions to be cladded has been put into position on a turntable.

This invention also relates to a tool capable of implementing the process according to the invention, to clad metal portions of a metal part for an aircraft turbojet, said cladding being done using a laser generated by a nozzle melting a powder to clad said metal parts, characterised in that the tool comprises:

a turntable on which the metal part is placed;

a lid placed on the turntable covering the entire metal part placed on the turntable, said lid having an opening inside which the nozzle is inserted for the cladding operations.

Apart from the main characteristics that have just been mentioned in the previous paragraph, the tool according to the invention may have one or several of the following complementary characteristics, considered individually or in any technically possible combination:

the tool has a telescopic tray placed in the opening of the lid, with an orifice inside which the nozzle is inserted.

the telescopic tray is a two-dimensional telescopic tray.

the nozzle placed in the orifice of the telescopic tray has a clearance with said orifice through which an inert gas present in the space between the lid and the turntable can escape during cladding.

the tool comprises a hose at the orifice in the telescopic tray;

the tool has sealing means between the turntable and the lid;

the tool has removable attachment means between the turntable and the lid.

the lid or the turntable has means of injecting a neutral gas.

the flow from means for injecting the neutral gas is between five and fifty litres per minute.

The invention and its different applications will be better understood after reading the following description and examining the accompanying figures.

BRIEF DESCRIPTION OF THE FIGURES

The figures are only given for guidance and are in no way limitative of the invention.

The figures show.

DETAILED PRESENTATION OF AT LEAST ONE EMBODIMENT OF THE INVENTION

Figure 2:
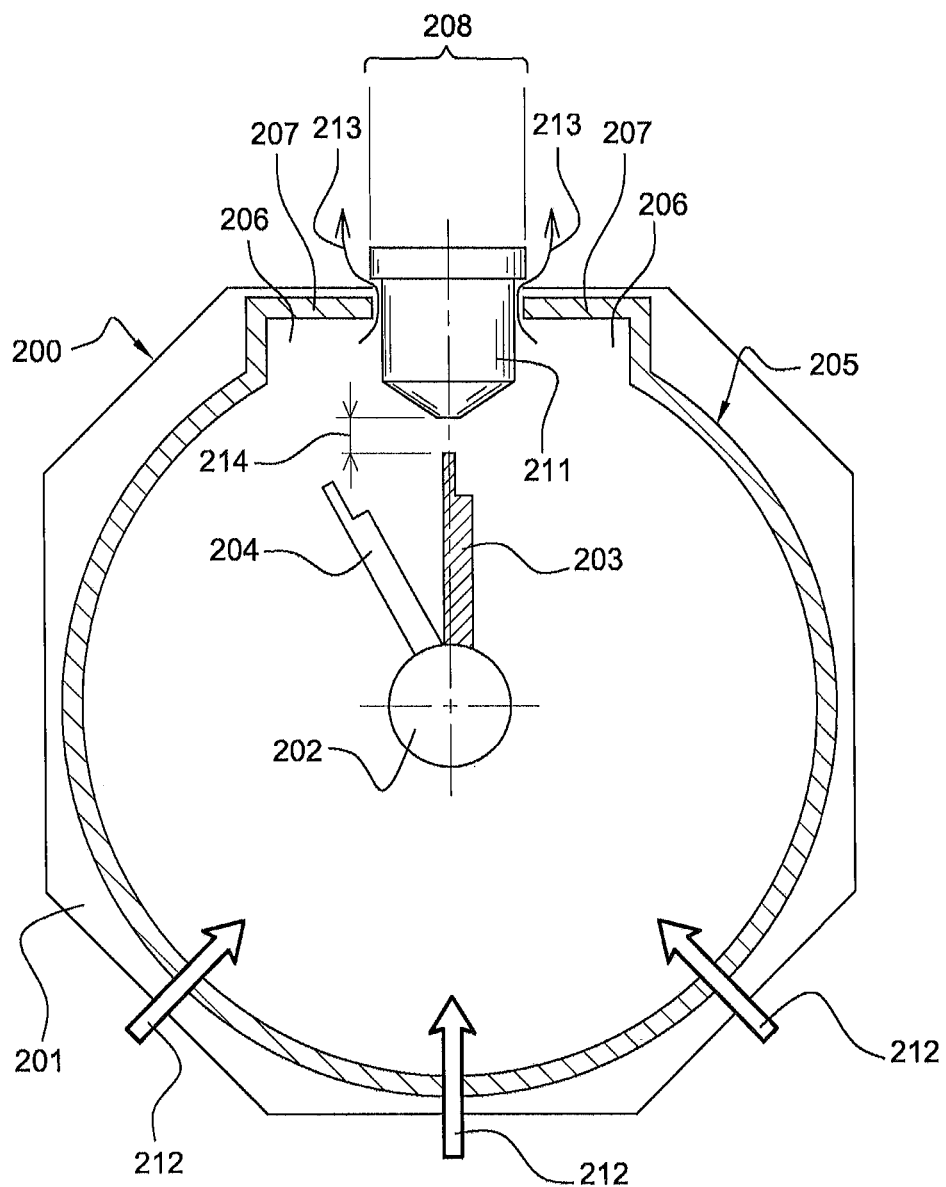
in FIG. 2, a diagrammatic view of an example tool that can be used for setting up the process according to the invention.

Unless specified otherwise, any element that appears in the different figures will have the same references. FIG. 2 shows an example tool 200 according to the invention.

In this case the tool 200 comprises:

a turntable 201 on which a metal part 202 on which a single-piece bladed disk (blisk) to be cladded is positioned, advantageously by fixing it. The part 202 has a plurality of metal portions to be cladded. Only a first metal portion 203 and a second metal portion 204 are illustrated in the example shown; in practice, a blisk will typically comprise twenty-eight blades, each of which forms a metal portion that will potentially have to be cladded, a lid 205 that will be placed on the turntable 201 such that the metal part 202 is located inside a hermetic space closed except at an opening 206 formed in the lid 205, under said lid 205.

The lid 205 advantageously comprises means 212 of injecting or supplying an inert gas capable of filling the volume under the lid 205 with an inert gas to prevent oxidation of the metal part 202 during cladding operations.

The lid 205 is advantageously fixed to the turntable 201. The attachment means are preferably removable. Removable attachment means refer to attachment means that can be retracted, released, at least partially and very simply, in a few seconds. The lid is thus advantageously centred on the turntable and is held in position by using for example "quick fasteners" or a bolt-nut clamping system.

In one advantageous embodiment, a complementary sealing system is provided, for example such an O-ring or a compressible seal, between the turntable 201 and the lid 205.

Figure 1:
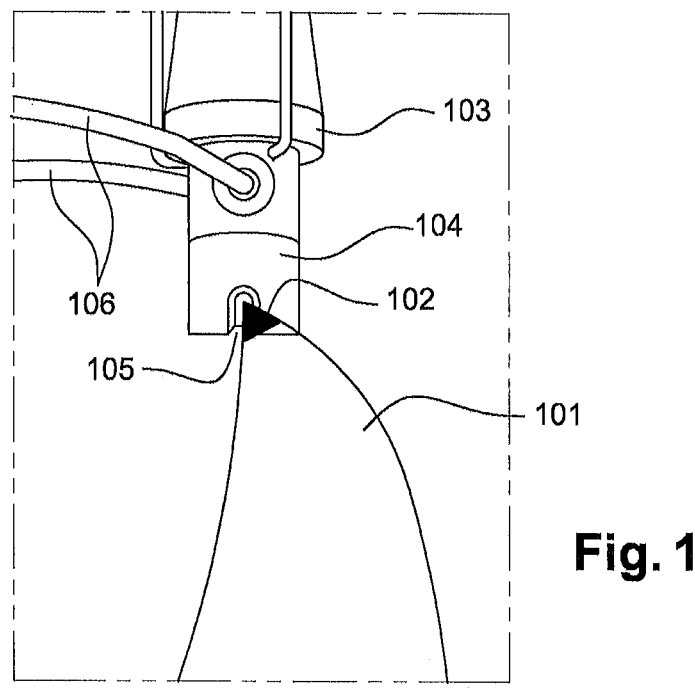
in FIG. 1 already described, a diagrammatic view of a process according to the state of the art for cladding a blade.
Figure 3:
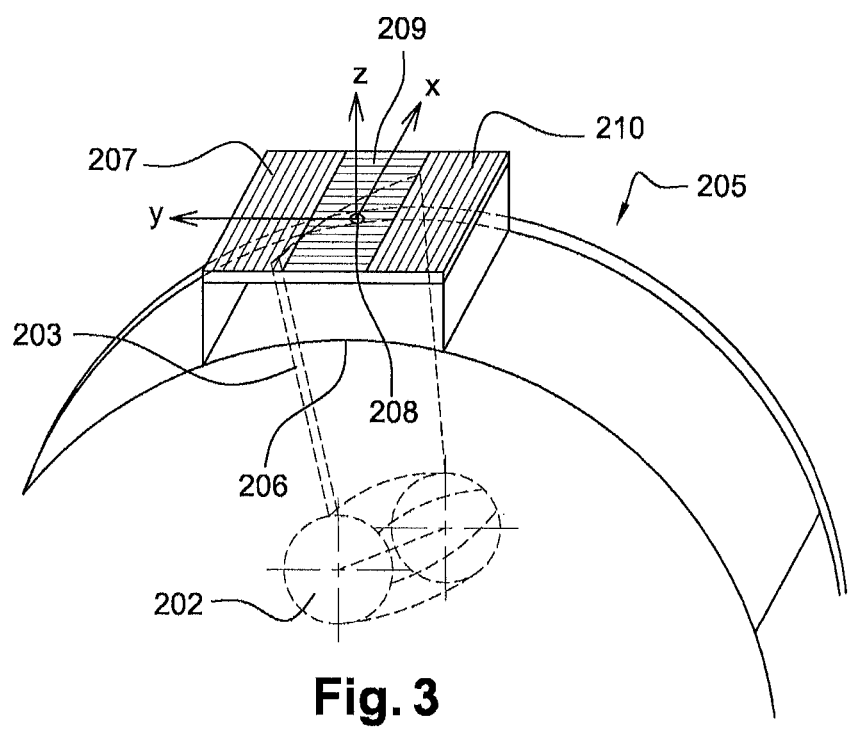
FIG. 3, a diagrammatic view of part of the tool in FIG. 2.

In one advantageous embodiment, the opening 206 is fitted with a telescopic tray type device 207 also visible in the perspective view in FIG. 3. The telescopic tray 207 advantageously closes off the opening 206 except at an orifice 208 that is smaller than the opening 206.

The telescopic tray 207 in the example shown is of the two-dimensional type; it thus comprises a first set of sliding plates 209 by which the orifice 208 can be displaced along a first direction corresponding to the x axis, and a second set of sliding plates 210 by which the orifice 208 can be displaced along a second direction corresponding to the y axis. The orifice 208 can thus be displaced over practically the entire surface defined by the telescopic tray 207—the displacement zone of the orifice 208 being limited at the edges of the telescopic tray 207 by the width of the sliding plates used.

In the invention, a nozzle 211 is placed at the opening 206, particularly at the orifice 208 when the telescopic tray 207 is installed. The head of the nozzle 211 is capable of emitting a laser beam or an electron beam. Being placed in the orifice 208, it is positioned at an optimum projection distance 214 and causes movement of the first set of sliding plates 209 and the second set of sliding plates 210 along the x and y directions; the nozzle head 211 is thus capable of moving over practically the entire area defined by the telescopic tray 207.

In the process according to the invention, the first metal portion 203 is placed facing the opening 206, and in the example shown, facing the orifice 208. The freedom of movement given to the nozzle 211 due to the presence of the telescopic tray 207 makes it possible to clad the entire first metal part 203, without having to displace said first metal part 203; it is held fixed to the turntable 201. The nozzle 211 can thus follow a displacement corresponding to a previously determined cladding trajectory.

In another embodiment, it is planned that the metal part to be cladded may also be mobile. Displacement of the nozzle relative to the metal part to be cladded is thus a relative displacement; either the nozzle alone is free to move; or the metal part to be cladded is also free to move in order to complete the cladding operations.

Once the first metal portion 203 has been cladded, the second metal portion 204 is cladded. This is done by separating the turntable 201 from the lid 205, for example by loosening the attachment means of the lid 205 onto the turntable 201. The turntable 201 is then rotated relative to the lid 205 such that the second metal part 204 is brought facing the orifice 208. When the second portion 204 is in position to be cladded, the turntable 201 is fixed to the lid 205 once again.

It is possible that some of the inert gas will escape when the turntable 201 and the lid 205 are separated. But even if such a loss actually occurs, it is minor and the space inside the lid 205 is quickly once again saturated with inert gas by activating the gas inlet means 212.

In some embodiments, there are leaks 213 at the nozzle head 211 when the nozzle head is positioned at the orifice 208, These leaks 213 are due to the need to leave some clearance between the nozzle head 211 and the orifice 208, particularly such that the nozzle can be rotated for example about the z axis, perpendicular to the plane defined by the telescopic tray 207. In this case the clearance is typically between one and ten millimetres.

Thus advantageously, the flow rate from the inlet means 212 of the inert gas, for example argon that has a high density relative to air, supplies between five and twenty five litres per minute so as to compensate for the loss of inert gas due to leaks 213 and also to make sure that there is an overpressure in the volume inside the lid 205.

In one particular example embodiment, the orifice 208 is fitted with a hose to reduce leaks 213 while allowing satisfactory freedom movement to the nozzle 211 to allow rotation of the nozzle.

The tool 200 according to the invention can also be used to perform an operation to determine cladding trajectories that the nozzle 211 should follow for each metal portion to be cladded, in a simplified manner, because this operation can be done under the same positioning conditions as the cladding operations. Thus, when the metal part 202 is placed on the turntable 201, each metal portion is felt by an appropriate sensor called a feeler, to determine defects in the metal portions to be cladded. The cladding trajectories to be followed by the nozzle 211 are thus determined for each metal portion considered.

The invention claimed is:

1. A process for cladding a metal part of an aircraft turbojet, said metal part comprising a plurality of metal portions to be cladded, said process using a nozzle for emitting a laser beam or an electron beam for melting a sprayed powder thus cladding said metal portions to be cladded, said process comprising:
   positioning the metal part comprising the plurality of metal portions to be cladded on a turntable;
   positioning a lid on the turntable, all of said metal part being positioned under said lid;
   inserting the nozzle into an opening present in the lid;
   injecting an inert gas under the lid;
   cladding a first portion of the plurality of metal portions of the metal part by performing a metallic powder spray operation, a laser beam emission operation to clad said first metal portion, and a relative displacement operation of the nozzle relative to said first metal portion following a predetermined cladding trajectory,
   fitting a telescopic tray into the opening present in the lid, the telescopic tray covering part of the opening and having an orifice inside which the nozzle is inserted, said orifice being smaller than the opening,
   wherein performing said relative displacement operation comprises moving said nozzle relative to said opening and within said opening,
   wherein the method further comprises fixing the lid onto the turntable in a sealed manner before injecting the inert gas, and
   wherein a clearance between 1 and 10 mm is maintained all around the nozzle between the nozzle and the orifice when said nozzle extends through the orifice, said clearance allowing gas present under the lid to escape via said clearance.

2. The process according to claim 1, further comprising, after the cladding of the first metal portion:
   rotating the turntable relative to the opening in the lid until a second metal portion among the plurality of metal portions to be cladded is facing the nozzle;
   cladding the second metal portion of the metal part.

3. The process according to claim 1, further comprising performing a feeling operation of the metal portions to be cladded to determine the cladding trajectories of the nozzle, after the metal part comprising the plurality of metal portions to be cladded has been put into position on a turntable.

4. The process according to claim 1, wherein said telescopic tray is a two-dimensional telescopic tray that includes a plurality of sliding plates that define the orifice between them, the sliding plates covering part of the opening and being movable to displace a position of the orifice within the opening.

5. The process according to claim 1, wherein during said cladding:
   the metal part remains positioned under said lid, and
   the nozzle is moved relative to said opening present in the lid and within said opening using the telescopic tray that is fitted in said opening so that the telescopic tray closes off the opening except at the orifice formed by sliding plates of the telescopic tray, said orifice being movable within said opening and said nozzle being inserted through said orifice.

6. The process according to claim 5, further comprising, during said cladding, moving the nozzle relative to the orifice.

7. The process according to claim 5, wherein, during said cladding, said inert gas leaks through said clearance.

8. A tool for implementing a process for cladding metal portions of a metal part for an aircraft turbojet, said cladding being done using a laser generated by a nozzle melting a powder to clad said metal portions, the tool comprising:
   a turntable on which the metal part is placed;
   a lid placed on the turntable covering the entire metal part placed on the turntable, said lid having an opening inside which the nozzle is inserted for the cladding operations;
   a gas supply arranged to supply an inert gas under the lid,
   a removable fastener between the turntable and the lid, the removable fastener adapted to fix the lid onto the turntable in a sealed manner, and a telescopic tray installed at the opening in the lid, said telescopic tray covering part of the opening and having an orifice in which the nozzle is inserted, said orifice being smaller than the opening, wherein said nozzle is constructed to be movable relative to said opening and within said opening following a predetermined cladding trajectory, and wherein a clearance between 1 and 10 mm is maintained all around the nozzle between the nozzle and the orifice when said nozzle extends through the orifice, said clearance allowing gas present under the lid to escape via said clearance.

9. The tool according to claim 8, wherein the telescopic tray is a two-dimensional telescopic tray.

10. The tool according to claim 8, comprising a hose at the orifice in the telescopic tray.

11. The tool according to claim 8, comprising a seal between the turntable and the lid.

12. The tool according to claim 8, wherein the lid or the turntable has an injector for injecting a neutral gas.

13. The tool according to claim 12, wherein a flow of the neutral gas supplied by the injector is between five and fifty litres per minute.

14. The tool according to claim 8, wherein said telescopic tray is a two-dimensional telescopic tray that includes a plurality of sliding plates that define the orifice between them, the sliding plates covering part of the opening and being movable to displace a position of the orifice within the opening.

15. The tool according to claim 8, wherein the telescopic tray closes off the opening except at the orifice formed by sliding plates of the telescopic tray, said orifice being movable within said opening and said nozzle being inserted through said orifice.

\* \* \* \* \*